United States Patent [19]

Sakuma et al.

[11] Patent Number: 4,934,772
[45] Date of Patent: Jun. 19, 1990

[54] LIGHT BEAM SCANNING LENS AND LIGHT BEAM SCANNING DEVICE

[75] Inventors: Nobuo Sakuma, Inagi; Katsumi Yamaguchi, Fuchu, both of Japan

[73] Assignee: Ricoh Company, Ltd., Tokyo, Japan

[21] Appl. No.: 279,096

[22] Filed: Dec. 2, 1988

[30] Foreign Application Priority Data

Dec. 2, 1987 [JP] Japan ............................... 62-304737
Feb. 12, 1988 [JP] Japan ............................... 63-030665
Nov. 21, 1988 [JP] Japan ............................... 63-294101

[51] Int. Cl.$^5$ .................... G02B 26/10; G02B 3/00
[52] U.S. Cl. ................................. 350/6.5; 350/6.7; 350/416; 350/412
[58] Field of Search .............. 350/6.1, 6.5, 6.6, 6.7, 350/6.8, 6.9, 6.91, 412, 416, 434

[56] References Cited

U.S. PATENT DOCUMENTS

| | | |
|---|---|---|
| 4,277,128 | 7/1981 | Kawamura ............................ 350/6.8 |
| 4,352,541 | 10/1982 | Mihoura et al. ..................... 350/6.8 |
| 4,496,209 | 1/1985 | Itoh et al. ............................ 350/434 |
| 4,571,035 | 2/1986 | Sakuma ................................. 350/6.8 |
| 4,789,230 | 12/1988 | Ohta ...................................... 350/6.8 |

Primary Examiner—Eugene R. Laroche
Assistant Examiner—Ronald M. Kalhmarik
Attorney, Agent, or Firm—Oblon, Spivak, McClelland, Maier & Neustadt

[57] ABSTRACT

A light beam scanning device has a light source, a condenser optical system, a light beam deflector, and a light beam scanning lens. The light source radiates a light beam which is converted by the condenser optical system. The convergent light beam is then deflected at a constant angular velocity by the light beam deflector. The light beam scanning lens comprises a single lens, and the convergent light beam deflected by the light beam deflector is applied to the light beam scanning lens. The light beam scanning lens places the path of movement, caused by the light beam deflector, of a naturally focused spot where the convergent light beam converged by the condenser optical system is focused, and the scanned surface in substantially conjugate relationship. The light beam scanning lens also scans the scanned surface with the light beam at an approximately constant velocity. Between the light beam scanning lens and the scanned surface, there may be disposed a correcting optical system for correcting curvature of field in an auxiliary scanning direction, or a correcting optical system for correcting curvatures of field in main and auxiliary scanning directions.

6 Claims, 18 Drawing Sheets

55°

-5.000  0  5.000

CURVATURE OF FIELD
(MAIN SCANNING DIRECTION)

60°

-5.000  0  5.000

55°

-5.000  0  5.000

55°

-5.000  0  5.000

CURVATURE OF FIELD
(MAIN SCANNING DIRECTION)

CURVATURE OF FIELD
(MAIN SCANNING DIRECTION)

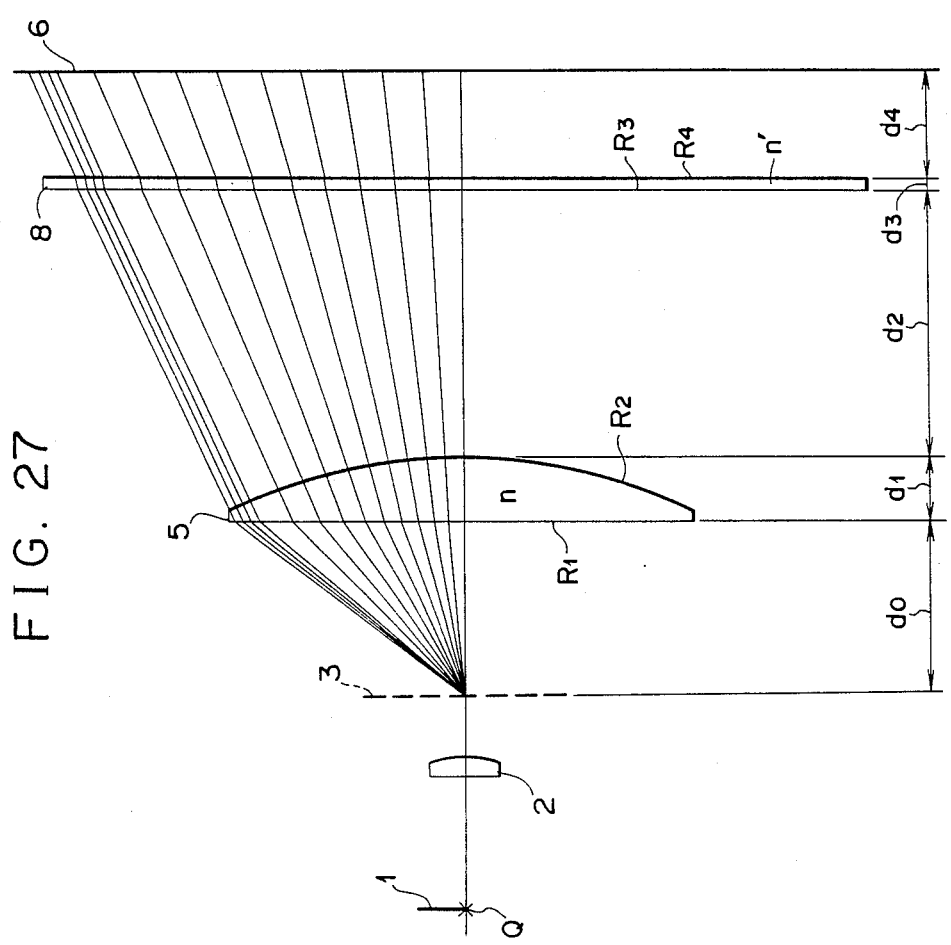

CURVATURE OF FIELD (mm)

CURVATURE OF FIELD (mm)

CURVATURE OF FIELD (mm)

CURVATURE OF FIELD (mm)

CURVATURE OF FIELD (mm)

CURVATURE OF FIELD (mm)

CURVATURE OF FIELD (mm)

CURVATURE OF FIELD (mm)

CURVATURE OF FIELD (mm)

CURVATURE OF FIELD (mm)

CURVATURE
OF FIELD (mm)

CURVATURE
OF FIELD (mm)

CURVATURE
OF FIELD (mm)

LIGHT BEAM SCANNING LENS AND LIGHT BEAM SCANNING DEVICE

BACKGROUND OF THE INVENTION

The present invention relates to a light beam scanning lens and a light beam scanning device employing such a light beam scanning lens.

Light beam scanning devices are widely used for writing optical information or reading documents. A focusing lens used in a light beam scanning device for focusing a deflected light beam onto a scanned surface is usually an f$\theta$ lens. For making light beam scanning devices, there is a demand for an f$\theta$ lens having a large total deflection angle. If an f$\theta$ lens comprises two or three lens elements, the total deflection angle exceeds 100°, but the cost of the f$\theta$ lens is high and so is the light beam scanning device employing the f$\theta$ lens. A single-element f$\theta$ lens is also proposed for a lower cost (see Japanese Patent Publication No. 61-48684, for example). Japanese Laid-Open Patent Publication No. 54-87540 discloses a lens system having the same function as an f$\theta$ lens for focusing a divergent light beam incident upon the lens system.

If a light beam scanning lens develops a large curvature of field, then the diameter of a beam spot which scans a surface varies as the scanning position moves, thus failing to scan the surface as desired.

One conventional method of correcting curvature of field employs a curved elongate cylindrical lens (see U.S. Pat. Nos. 4,496,209 and 4,639,072 and Japanese Laid-Open Patent Publication No. 58-200214, for example).

The f$\theta$ lens proposed in Japanese Patent Publication No. 61-48684 produces a curvature of field of more than 5–10 mm at a half angle of view of about 21° with respect to the focal length f=300 mm.

The lens system disclosed in Japanese Laid-Open Patent Publication No. 54-87540 generates a curvature of field of more than 5 mm at a half angle of view ranging from 15° to 21° with respect to the focal length f=150 mm.

These conventional lens systems are therefore not of sufficient performance for use in a light beam scanning device having a large deflection angle.

The curved cylindrical lens referred to above for correcting curvature of field is not effective in correcting curvature of field in a main scanning direction since the cylindrical lens has no substantial power in the main scanning direction.

SUMMARY OF THE INVENTION

The present invention has been made in view of the aforesaid drawbacks of the conventional light beam scanning lenses.

It is a first object of the present invention to provide a novel light beam scanning lens which is of a single-element arrangement, has a function similar to that of an f$\theta$ lens, and is capable of effectively scanning a surface through a large deflection angle in excess of 100°.

A second object of the present invention is to provide a novel light beam scanning device which employs the above light beam scanning lens.

A third object of the present invention is to provide a novel light beam scanning device which employs a single-element light beam scanning lens, can scan a surface through a large deflection angle, and can effective correct curvature of field in both main and auxiliary scanning directions.

A light beam scanning lens according to the present invention comprises a single lens for focusing a convergent light beam deflected at a constant angular velocity into a beam spot on a scanned surface and scanning the focused light beam at a substantially constant velocity.

The light beam scanning lens is made of a material having a refractive index n and a focal length f, and meets the following condition:
$R_2 < 0$ and $|R_1| > |R_2|$ where $R_1$ is the radius of curvature of a surface of the lens near a point where the incident light beam is deflected, and $R_2$ is the radius of curvature of surface of the lens the scanned surface; and also the following conditions:

$$-7 < (nf/t) + (f/s) < -0.6 \qquad (i)$$

$$-0.41 < (t/f) < -0.13 \qquad (ii)$$

where t is the distance as measured from a front principal point of the lens up to an entrance pupil, and s is the distance as measured from the front principal point up to a naturally focused point.

A light beam scanning device comprises a light source for radiating a light beam, a condenser optical system for converging the light beam from the light source, a light beam deflector for deflecting the convergent light beam from the condenser optical system at a constant angular velocity, and a light beam scanning lens for focusing the convergent light beam deflected by the light beam deflector into a beam spot on a scanned surface and scanning the focused light beam at a substantially constant velocity.

The light beam scanning device may also include correcting means for well correcting curvature of field in an auxiliary scanning direction, the correcting means comprising an elongate cylindrical lens or an elongate toroidal lens.

A light beam scanning device capable of correcting curvatures of field in main and auxiliary scanning directions comprises a light source for radiating a light beam, a condenser optical system for converging the light beam from the light source, a light beam deflector for deflecting the convergent light beam from the condenser optical system at a constant angular velocity, a light beam scanning lens for focusing the convergent light beam deflected by the light beam deflector into a beam spot on a scanned surface and scanning the focused light beam at a substantially constant velocity, the light beam scanning lens comprising a single lens, and a correcting optical system coacting with the light beam scanning lens for focusing the convergent light beam into a spot substantially on the scanned surface, the correcting optical system comprising an elongate toroidal lens disposed between the light beam scanning lens and the scanned surface and having a first convex surface facing the light beam deflector in a main scanning direction, the toroidal lens meeting the following conditions:

$$0.2 < (l^2 + h^2)/(2l \cdot R_{1X}) < 0.74 \qquad (I)$$

$$0.007 < (n'-1)\{(1/R_{1X}) - (1/R_{2X})\}L < 0.059 \qquad (II)$$

where n' is the refractive index, $R_{1X}$ is the radius of curvature of the first surface in the main scanning direction, $R_{2X}$ is the radius of curvature of a second surface in the main scanning direction, l is the distance from the first surface to the scanned surface, and h is ½ of the effective scanning range, and L is the distance from a point where the light beam is deflected by the light beam deflector to the scanned surface.

The light beam scanning lens of the above arrangement can scan the scanned surface with the light beam through a large deflection angle in excess of 100°, even through the light beam scanning lens comprises a single lens.

The light beam scanning device which employs the light beam scanning lens is simple in construction and can well scan the scanned surface with the light beam through a large deflection angle. By employing an elongate cylindrical lens as the correcting means for correcting curvature of field, the curvature of field in the auxiliary scanning direction can be well corrected.

According to a light beam scanning device which employs an elongate toroidal lens having power in both main and auxiliary scanning directions, a single light beam scanning lens made of plastics can be employed to keep good curvature of field in the main and auxiliary scanning directions, and linearity of the device is good and can sufficiently be corrected electrically. Therefore, the light beam scanning device is low in cost, compact, and of high performance for well scanning the scanned surface with a uniform beam spot.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 27 is a schematic view illustrating a light beam scanning device according to a second embodiment of the present invention;

FIG. 28 is a diagram showing curvature of field produced by the light beam scanning device of the second embodiment;

DETAILED DESCRIPTION OF THE INVENTION AND PREFERRED EMBODIMENTS

Figure 1:
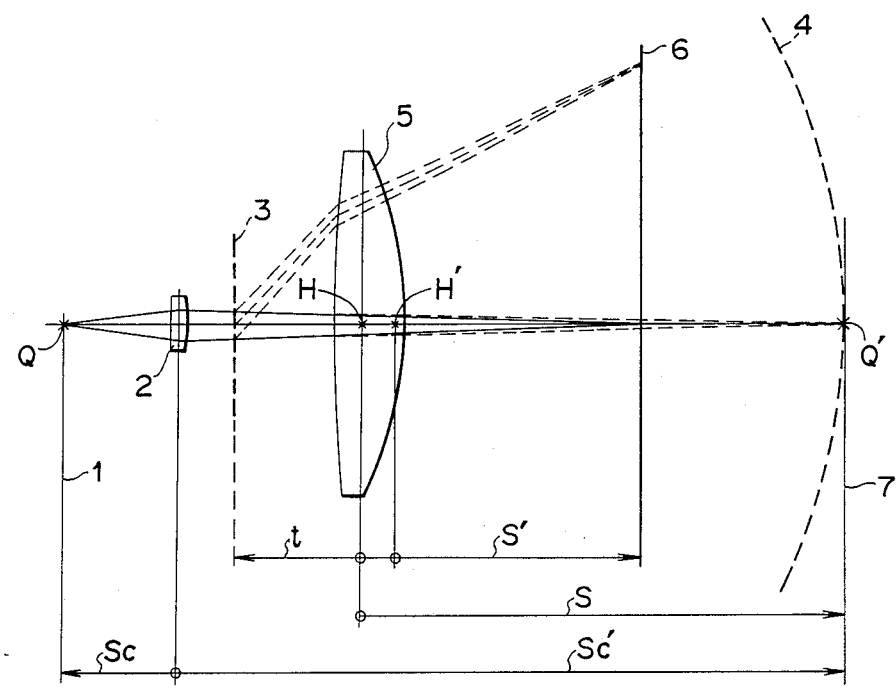
FIG. 1 is a schematic view showing a basic structure of a light beam scanning device according to the present invention.

FIG. 1 schematically shows a basic structure of a light beam scanning device employing a light beam scanning lens according to the present invention.

The light beam scanning device includes a light source Q, a condenser lens 2 as a condenser optical system, and a light beam scanning lens 5.

The light source Q radiates a scanning light beam and may comprise a semiconductor laser, a light-emitting diode, or any of other light sources. In FIG. 1, the light source Q is assumed to be a semiconductor laser. The light source Q is disposed on the optical axis of the condenser lens 2 on its object side for applying a divergent light beam to the condenser lens 2. A plane 1, which is an object plane, lies at the light source Q and extends perpendicularly to the optical axis. The condenser lens 2 and the object plane 1 are spaced from each other by a distance Sc up to the object.

The light beam applied to the condenser lens 2 would be focused onto a point Q' on an image plane 7 if there were nothing in the image side of the condenser lens 2. Denoted at Sc' is a distance from the condenser lens 2 up to a focused image.

The deflecting surface of a light beam deflector is schematically indicated at 3 in FIG. 1. The light beam deflector comprises a device for deflecting a light beam at a constant angular velocity, such as a polygon mirror or a pyramidal mirror.

By deflecting the light beam converged by the condenser lens 2 with the light beam deflector, the focused spot of the light beam from the lens 2 moves along an arc 4. Where the light beam deflector comprises a polygon mirror, since the point where the light beam is deflected is slightly fluctuated on the optical axis, the path of movement of the focused spot is not completely arcuate, but is of a shape similar to the arc 4.

The light beam scanning lens 5 has positive refracting power and is disposed between the scanned surface and the point where the light beam is deflected by the light beam deflector. The light beam scanning lens 5 focuses, with its positive refracting power, the incident deflected convergent light beam as a spot substantially on a scanned surface 6. Stated otherwise, the light beam scanning lens 5 ideally regards the path of movement of the deflected point focused by the condenser lens 2 as a virtual light source object position, and holds such a position in conjugate relation to the scanned surface 6. Therefore, assuming that the distance from the front principal point H of the light beam scanning lens 5 to the image plane 7, i.e., the distance from the front principal point H to the focused point of the condenser lens 2, is represented by S, and the distance from the rear principal point H' of the lens 5 to the scanned surface 6 is represented by S', the following equation is established:

$$(1/S)-(1/S')=-1/f$$

where f represents the focal length of the light beam scanning lens 5.

With respect to the light beam scanning lens 5, the distance as measured from the front principal point H to the entrance pupil is indicated by t as shown.

The refractive index n of the light beam scanning lens, the focal length f thereof, and the distances S, t meet the conditions (i), (ii) described above. These distances can take a positive or negative value according to geometrical optics.

The condition (i) serves to uniformize the diameters of main scanning spots. If the lower limit of the condition (i) were exceeded, the curvature of field on the meridional image surface would be excessively under at an intermediate image height, making it difficult to uniformize main scanning spot diameters. If the upper limit of the condition were exceeded, the curvature of field on the meridional image surface would fall under at an entire image height, also making it difficult to uniformize main scanning spot diameters.

If the lower limit of the condition (ii) were exceeded, the light beam scanning lens would be too large to be practical. If the upper limit of this condition were exceeded, the fθ characteristics, i.e., linearity would be worse, in excess of 20%, and deviations from the constant velocity of the scanning light beam for writing or reading optical information would no longer be corrected by electrical processing.

The light beam scanning lens according to the present invention serves to focus a convergent light beam deflected at a constant angular velocity onto a scanned surface, and scan the light beam at a substantially constant velocity, as described above. The substantially constant velocity means such a constant velocity that deviations from the constant velocity are only to the extent that they can be corrected by electric signal processing.

As described above, according to the present invention, the deflected convergent light beam is further focused by the light beam scanning lens, and the scanned surface is placed in the vicinity of a point where the light beam is focused, so that the curvature of field can largely be improved.

Where an elongate cylindrical lens or an elongate toroidal lens is employed to correct curvature of field in an auxiliary scanning direction, such a lens is disposed between the light beam scanning lens and the scanned surface.

Figure 31:
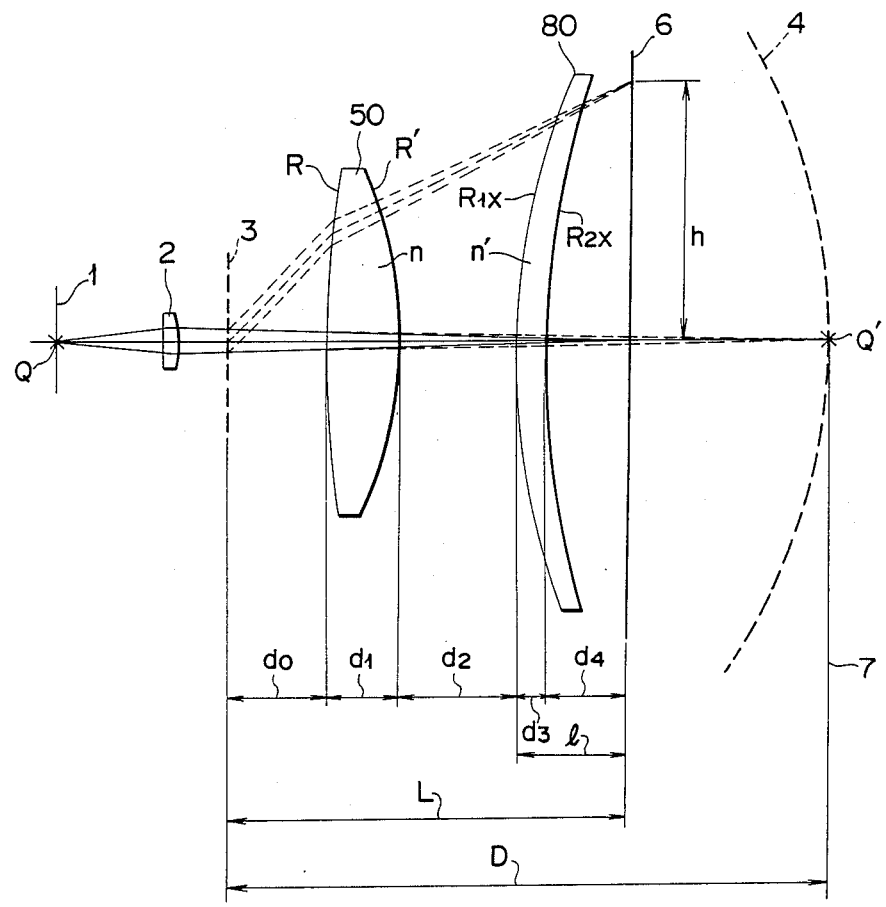
FIG. 31 is a schematic view showing a basic structure of a light beam scanning device which employs an elongate cylindrical lens having power in both main and auxiliary scanning directions.

FIG. 31 schematically shows a basic structure of a light beam scanning device capable of well correcting curvature of field in both main and auxiliary scanning directions.

The light beam scanning device includes a light source Q, a condenser lens 2 as a condenser optical system, and a light beam scanning lens 50.

The light source Q may comprise a semiconductor laser, a light-emitting diode, or any of other light sources, as with the arrangement shown in FIG. 1. In FIG. 31, the light source Q is also assumed to be a semiconductor laser. The light source Q applies a divergent light beam to the condenser lens 2. A plane 1 is an object plane. The light beam applied to the condenser lens 2 would be focused onto a naturally focused point, i.e., a point Q' on an image plane 7 if there were nothing in the image side of the condenser lens 2.

As with the device of FIG. 1, a light beam deflector comprises a device for deflecting a light beam at a constant angular velocity, such as a polygon mirror or a pyramidal mirror.

By deflecting the light beam converged by the condenser lens 2 with the light beam deflector, the focused spot of the light beam from the lens 2 moves along an arc 4. Where the light beam deflector comprises a polygon mirror, the path of movement of the focused spot is of a shape similar to the arc 4.

The light beam scanning lens 50 has positive refracting power and is disposed between a scanned surface 6 and the point where the light beam is deflected by the light beam deflector.

An elongate toroidal lens 80 has strong positive refracting power in an auxiliary scanning direction (normal to the sheet of FIG. 31) and weaker refracting power in a main scanning direction than the light beam scanning lens 50. The elongate toroidal lens 80 is disposed between the light beam scanning lens 50 and the scanned surface 6.

The light beam scanning lens 50 focuses, with its positive refracting power, the incident deflected convergent light beam as a spot substantially on a scanned surface 6, in coaction with the elongate toroidal lens 80.

Denoted at L, l, h in FIG. 31 are the distances described above with reference to the conditions (I), (II), and D is the distance from the point where the light beam is deflected by the light beam deflector to the image plane 7.

The elongate toroidal lens 80 has two functions. One function is to correct curvature of field in the auxiliary scanning direction. If an elongate cylindrical lens were used as a correcting optical system instead of the elongate toroidal lens 80, curvature of field in the auxiliary scanning direction would be made smaller than if no correcting optical system were employed, but the correction would not be sufficient. More specifically, since the light beam is applied obliquely off-axis to the elongate cylindrical lens, the refracting power thereof in the auxiliary scanning lens would be large, and the focused point would be displaced toward the light beam deflector, with the result that a bow-shaped curvature of field, concave toward the light beam deflector, would be produced.

According to the present invention, the elongate toroidal lens 80 with its first convex surface directed toward the light beam deflector in the main scanning direction is employed as a correcting optical system for correcting the bow-shaped curvature of field to provide a flatter image plane.

It is possible to employ an elongate cylindrical lens as a correcting optical system to reduce curvature of field by reducing the focal length of the lens in the auxiliary scanning direction. However, since the distance between the elongate cylindrical lens and the scanned surface is small, this correcting arrangement suffers mechanical limitations of the light beam scanning device.

The second function of the elongate toroidal lens is to correct curvature of field in the main scanning direction.

Where an elongate toroidal lens of a substantially constant thickness, heretofore known as a means for correcting curvature of field in the auxiliary scanning direction, is employed, if the refractive index of the light beam scanning lens which is a plano-convex or double-concave lens is small, the curvature of field in the main scanning direction is somewhat under at an intermediate image height or as the image height is greater. According to the present invention, because the elongate toroidal lens has positive refracting power also in the main scanning direction, it can improve curvature of field in the main scanning direction.

The elongate toroidal lens meets the conditions (I), (II) described above.

The condition (I) serves to determine a range for the radius L of curvature $R_{1X}$ in the main scanning direction of the first surface of the elongate toroidal lens. If the lower limit of this condition were exceeded, the curvature of field in the auxiliary scanning direction would not be sufficiently corrected. If the upper limit were exceeded, the curvature of field in the auxiliary scanning direction would be excessively corrected, and the opposite ends of the elongate toroidal lens would be too close to the scanned surface 6.

The condition (II) serves to determine a range for the refracting power of the elongate toroidal lens in the main scanning direction. If the lower limit were exceeded, the curvature of field in the main scanning direction would not be sufficiently corrected. If the upper limit were exceeded, the curvature of field in the main scanning direction would be excessively corrected.

Where a polygon mirror is employed as the light beam deflector, facet errors can be corrected by positioning the elongate toroidal lens in order to place the point where the light beam is deflected by the light beam deflector and the scanned surface in conjugate relationship substantially in terms of geometrical optics in the auxiliary scanning direction.

It is advantageous to make the elongate toroidal lens of plastics from the standpoint of mass production and low cost since it can easily be molded.

If only curvature of field in the auxiliary scanning direction were to be corrected, an elongate toroidal lens which has almost no power could be employed in the main scanning direction. Where such an elongate toroidal lens is used, if the refractive index of the light beam scanning lens were low (less than 1.6, for example) and the single lens were plano-convex or double-concave, the curvature of field in the main scanning lens would be under. If the single lens of low refractive index were of a meniscus shape, the curvature of field could be well corrected, but linearity would become worse. Therefore, the single lens having an approximate fθ lens function could not be formed of plastics having a small refractive index.

Specific embodiments will be described below.

22 embodiments with respect to the light beam scanning lens described with reference to FIGS. 1 and 2 will be given below.

Figure 2:
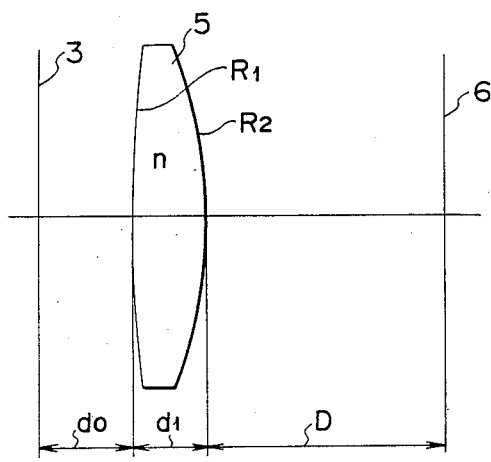
FIG. 2 is a schematic view of a light beam scanning lens according to the present invention.

As shown in FIG. 2, in each of the embodiments, $R_1$, $R_2$ represent, respectively, the radii of curvature of the surface of the light beam scanning lens near the light beam deflector (on the lefthand side in FIG. 2) and the surface of the light beam scanning lens near the scanned surface 6, $d_0$ the distance between the lens surface near the light beam deflector and the point where the light beam is deflected by the light beam deflector, $d_1$ the distance between the surfaces of the light beam scanning lens, and D the distance between the lens surface near the scanned surface 6 and the scanned surface 6. X indicates a parameter $(nf/t)+(f/s)$ in the condition (i), and Y indicates $(t/f)$ in the condition (ii).

In the 22 lens embodiments, the focal length f of the light beam scanning lens is 200.

Since $R_2 < 0$ and $|R_1| > |R_2|$, the surface of the light beam scanning lens near the scanned surface is convex, and the light beam scanning lens may be a plano-convex lens, a double-convex lens, or a convex meniscus lens. The light beam scanning lens is a plano-convex lens in the embodiments 1 through 10, a double-convex lens in the embodiments 11 through 16, and a convex meniscus lens in the embodiments 17 through 22.

Embodiment 1:

| $R_1$ | $R_2$ | $d_0$ | $d_1$ | D | n |
|---|---|---|---|---|---|
| ∞ | −80 | 13 | 20 | 26.087 | 1.4 | f = 200, s = 30, t = −27.286, X = −3.6, Y = −0.13643

The maximum deflection angle: 110°, the write width: 114.6, the linearity: 19.8% or less.

Figure 3:
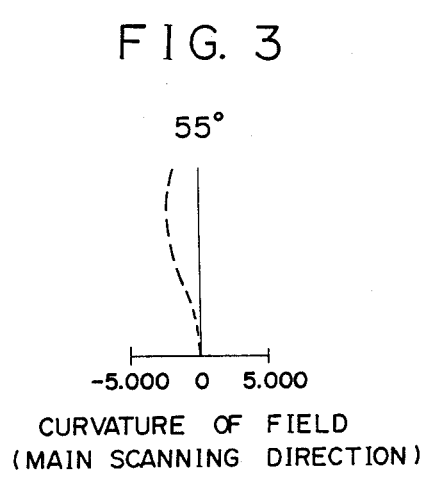
FIGS. 3 through 24 are diagrams illustrating curvature of field produced by light beam scanning lenses according to embodiments of the present invention.

FIG. 3 shows the curvature of field of this embodiment in the main scanning direction.

Embodiment 2:

| $R_1$ | $R_2$ | $d_0$ | $d_1$ | D | n |
|---|---|---|---|---|---|
| ∞ | −80 | 25 | 20 | 75 | 1.4 | f = 200, s = 120, t = −39.286, X = −5.46, Y = −0.19643

The maximum deflection angle: 120°, the write width: 240.8, the linearity: 15.5% or less.

Figure 4:
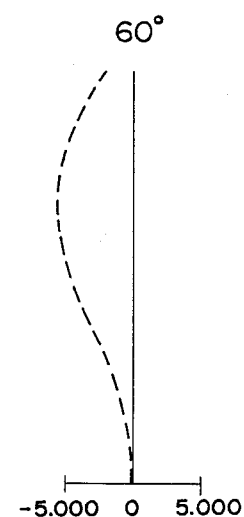

FIG. 4 shows the curvature of field of this embodiment in the main scanning direction.

Embodiment 3:

| $R_1$ | $R_2$ | $d_0$ | $d_1$ | D | n |
|---|---|---|---|---|---|
| ∞ | −100 | 21 | 20 | 38.709 | 1.5 | f = 200, s = 48, t = −34.333, X = −4.57, Y = −0.17167

The maximum deflection angle: 110°, the write width: 150.0, the linearity: 17.7% or less.

Figure 5:
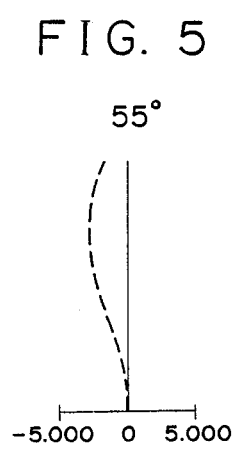

FIG. 5 shows the curvature of field of this embodiment in the main scanning direction.

Embodiment 4:

| $R_1$ | $R_2$ | $d_0$ | $d_1$ | D | n |
|---|---|---|---|---|---|
| ∞ | −100 | 36 | 20 | 75 | 1.5 | f = 200, s = 120, t = −49.333, X = −4.41, Y = −0.24667

The maximum deflection angle: 110°, the write width: 227.5, the linearity: 19.8% or less.

Figure 6:
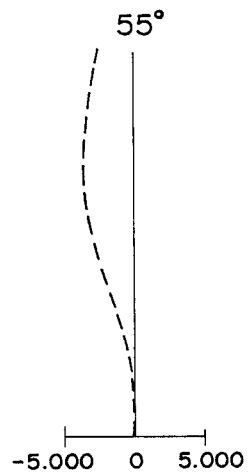

FIG. 6 shows the curvature of field of this embodiment in the main scanning direction.

Embodiment 5:

| $R_1$ | $R_2$ | $d_0$ | $d_1$ | D | n |
|---|---|---|---|---|---|
| ∞ | −160 | 15.5 | 20 | 26.087 | 1.8 | f = 200, s = 30, t = −26.111, X = −6.86, Y = −0.13056

The maximum deflection angle: 110°, the write width: 111.8, the linearity: 18.3% or less.

Figure 7:
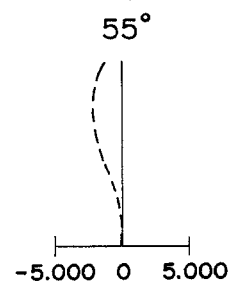

FIG. 7 shows the curvature of field of this embodiment in the main scanning direction.

Embodiment 6:

| $R_1$ | $R_2$ | $d_0$ | $d_1$ | D | n |
|---|---|---|---|---|---| f = 200, s = 120, t = −65.111, X = −3.86, Y = −0.32556

-continued

| | | | | | |
|---|---|---|---|---|---|
| ∞ | −160 | 54 | 20 | 75 | 1.8 |

The maximum deflection angle: 110°, the write width: 245.5, the linearity: 10.5% or less.

Figure 8:
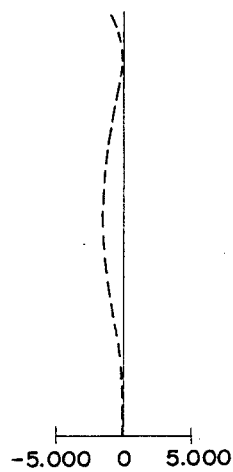

FIG. 8 shows the curvature of field of this embodiment in the main scanning direction.

Embodiment 7:

| $f = 200$, $s = 300$, $t = -66.111$, $X = -4.78$, $Y = -0.33056$ | | | | | |
|---|---|---|---|---|---|
| $R_1$ | $R_2$ | $d_0$ | $d_1$ | $D$ | $n$ |
| ∞ | −160 | 55 | 20 | 120 | 1.8 |

The maximum deflection angle: 100°, the write width: 263.2, the linearity: 3.0% or less.

Figure 9:
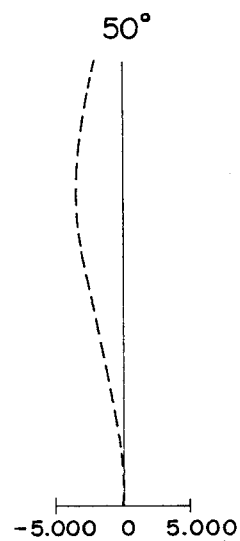

FIG. 9 shows the curvature of field of this embodiment in the main scanning direction.

Embodiment 8:

| $f = 200$, $s = 30$, $t = -49.222$, $X = -0.65$, $Y = -0.24611$ | | | | | |
|---|---|---|---|---|---|
| $R_1$ | $R_2$ | $d_0$ | $d_1$ | $D$ | $n$ |
| ∞ | −160 | 27 | 40 | 26.087 | 1.8 |

The maximum deflection angle: 110°, the write width: 154.5, the linearity: 16.8% or less.

Figure 10:
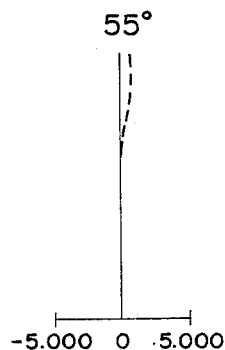

FIG. 10 shows the curvature of field of this embodiment in the main scanning direction.

Embodiment 9:

| $f = 200$, $s = 120$, $t = -76.222$, $X = -3.06$, $Y = -0.38111$ | | | | | |
|---|---|---|---|---|---|
| $R_1$ | $R_2$ | $d_0$ | $d_1$ | $D$ | $n$ |
| ∞ | −160 | 54 | 40 | 75 | 1.8 |

The maximum deflection angle: 110°, the write width: 254.6, the linearity: 8.1% or less.

Figure 11:
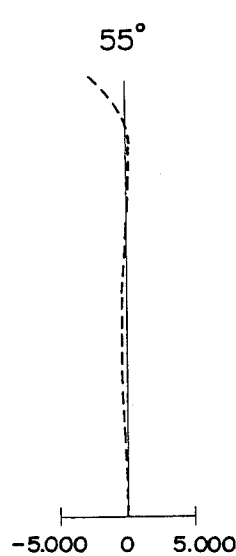

FIG. 11 shows the curvature of field of this embodiment in the main scanning direction.

Embodiment 10:

| $f = 200$, $s = 300$, $t = -67.222$, $X = -4.69$, $Y = -0.33611$ | | | | | |
|---|---|---|---|---|---|
| $R_1$ | $R_2$ | $d_0$ | $d_1$ | $D$ | $n$ |
| ∞ | −160 | 45 | 40 | 120 | 1.8 |

The maximum deflection angle: 120°, the write width: 312.0, the linearity: 2.2% or less.

Figure 12:
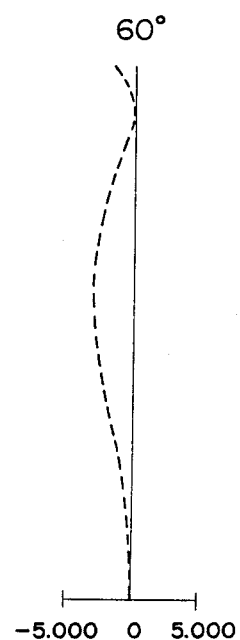

FIG. 12 shows the curvature of field of this embodiment in the main scanning direction.

Embodiment 11:

| $f = 200$, $s = 30$, $t = -26.594$, $X = -3.86$, $Y = -0.13297$ | | | | | |
|---|---|---|---|---|---|
| $R_1$ | $R_2$ | $d_0$ | $d_1$ | $D$ | $n$ |
| 400 | −98.571 | 15 | 20 | 23.23 | 1.4 |

The maximum deflection angle: 110°, the write width: 112.6, the linearity: 19.2% or less.

Figure 13:
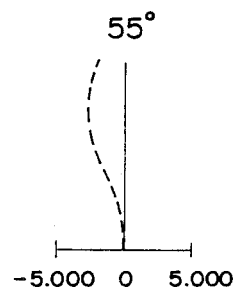

FIG. 13 shows the curvature of field of this embodiment in the main scanning direction.

Embodiment 12:

| $f = 200$, $s = 60$, $t = -38.594$, $X = -3.92$, $Y = -0.19297$ | | | | | |
|---|---|---|---|---|---|
| $R_1$ | $R_2$ | $d_0$ | $d_1$ | $D$ | $n$ |
| 400 | −98.571 | 27 | 20 | 43.297 | 1.4 |

The maximum deflection angle: 120°, the write width: 186.7, the linearity: 17.5% or less.

Figure 14:
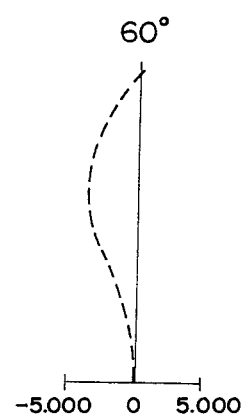

FIG. 14 shows the curvature of field of this embodiment in the main scanning direction.

Embodiment 13:

| $f = 200$, $s = 100$, $t = -43.594$, $X = -4.42$, $Y = -0.21797$ | | | | | |
|---|---|---|---|---|---|
| $R_1$ | $R_2$ | $d_0$ | $d_1$ | $D$ | $n$ |
| 400 | −98.571 | 32 | 20 | 63.809 | 1.4 |

The maximum deflection angle: 110°, the write width: 201.8, the linearity: 9.8% or less.

Figure 15:
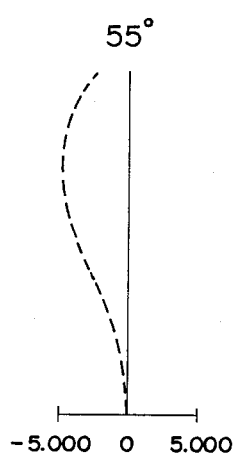

FIG. 15 shows the curvature of field of this embodiment in the main scanning direction.

Embodiment 14:

| $f = 200$, $s = 41.811$, $t = -31.989$, $X = -6.47$, $Y = -0.15995$ | | | | | |
|---|---|---|---|---|---|
| $R_1$ | $R_2$ | $d_0$ | $d_1$ | $D$ | $n$ |
| 800 | −197.778 | 23 | 20 | 32.359 | 1.8 |

The maximum deflection angle: 110°, the write width: 137.0, the linearity: 16.9% or less.

Figure 16:
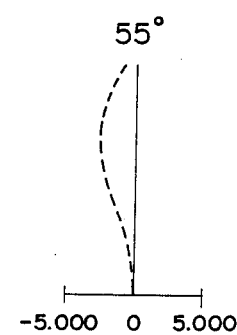

FIG. 16 shows the curvature of field of this embodiment in the main scanning direction.

Embodiment 15:

| $f = 200$, $s = 120$, $t = -81.559$, $X = -2.75$, $Y = -0.40779$ | | | | | |
|---|---|---|---|---|---|
| $R_1$ | $R_2$ | $d_0$ | $d_1$ | $D$ | $n$ |
| 800 | −196.667 | 68 | 30 | 71.667 | 1.8 |

The maximum deflection angle: 100°, the write width: 233.0, the linearity: 6.0% or less.

Figure 17:
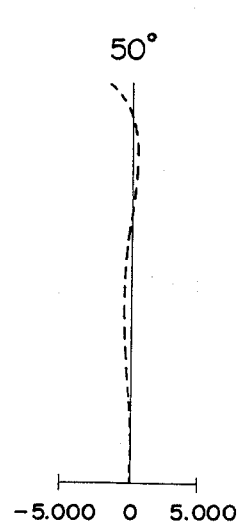

FIG. 17 shows the curvature of field of this embodiment in the main scanning direction.

Embodiment 16:

| $f = 200$, $s = 301.811$, $t = -70.489$, $X = -4.44$, $Y = -0.35245$ | | | | | |
|---|---|---|---|---|---|
| $R_1$ | $R_2$ | $d_0$ | $d_1$ | $D$ | $n$ |
| 800 | −197.778 | 61.5 | 20 | 118.067 | 1.8 |

The maximum deflection angle: 100°, the write width: 256.0, the linearity: −1.1~0.6% or less.

Figure 18:
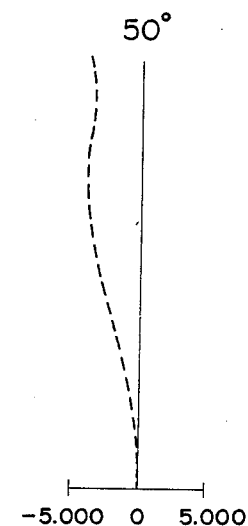

FIG. 18 shows the curvature of field of this embodiment in the main scanning direction.

Embodiment 17:

| $f = 200$, $s = 30$, $t = -35.227$, $X = -1.28$, $Y = -0.17614$ | | | | | |
|---|---|---|---|---|---|
| $R_1$ | $R_2$ | $d_0$ | $d_1$ | $D$ | $n$ |
| −120 | −50.286 | 12.5 | 20 | 35.611 | 1.4 |

The maximum deflection angle: 100°, the write width: 116.4, the linearity: 17.6% or less.

Figure 19:
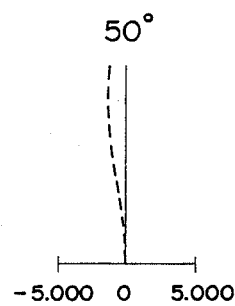

FIG. 19 shows the curvature of field of this embodiment in the main scanning direction.

Embodiment 18:

| $f = 200$, $s = 120$, $t = -41.927$, $X = -5.01$, $Y = -0.20964$ | | | | | |
|---|---|---|---|---|---|
| $R_1$ | $R_2$ | $d_0$ | $d_1$ | $D$ | $n$ |
| −120 | −50.286 | 19.2 | 20 | 84.524 | 1.4 |

The maximum deflection angle: 100°, the write width: 205.4, the linearity: 16.3% or less.

Figure 20:
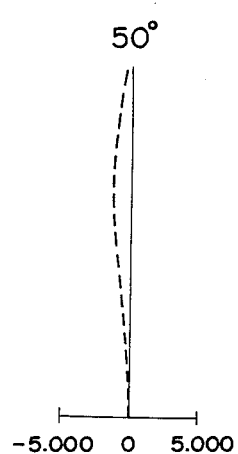

FIG. 20 shows the curvature of field of this embodiment in the main scanning direction.

Embodiment 19:

| $f = 200, s = 600, t = -47.727, X = -5.53, Y = -0.23864$ | | | | | |
|---|---|---|---|---|---|
| $R_1$ | $R_2$ | $d_0$ | $d_1$ | $D$ | $n$ |
| $-120$ | $-50.286$ | 25 | 20 | 159.525 | 1.4 |

The maximum deflection angle: 110°, the write width: 369.6, the linearity: 18.9% or less.

Figure 21:
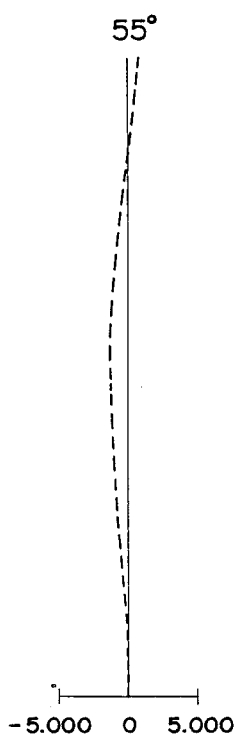

FIG. 21 shows the curvature of field of this embodiment in the main scanning direction.

Embodiment 20:

| $f = 200, s = 30, t = -33.857, X = -3.97, Y = -0.16929$ | | | | | |
|---|---|---|---|---|---|
| $R_1$ | $R_2$ | $d_0$ | $d_1$ | $D$ | $n$ |
| $-240$ | $-99.556$ | 16 | 20 | 33.494 | 1.8 |

The maximum deflection angle: 110°, the write width: 127.1, the linearity: 19.3% or less.

Figure 22:
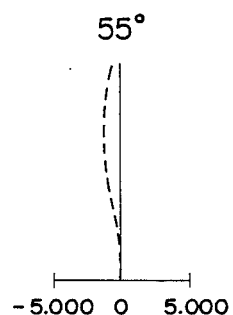

FIG. 22 shows the curvature of field of this embodiment in the main scanning direction.

Embodiment 21:

| $f = 200, s = 120, t = -50.257, X = -5.50, Y = -0.25129$ | | | | | |
|---|---|---|---|---|---|
| $R_1$ | $R_2$ | $d_0$ | $d_1$ | $D$ | $n$ |
| $-240$ | $-99.556$ | 32.4 | 20 | 82.408 | 1.8 |

The maximum deflection angle: 120°, the write width: 265.4, the linearity: 19.1% or less.

Figure 23:
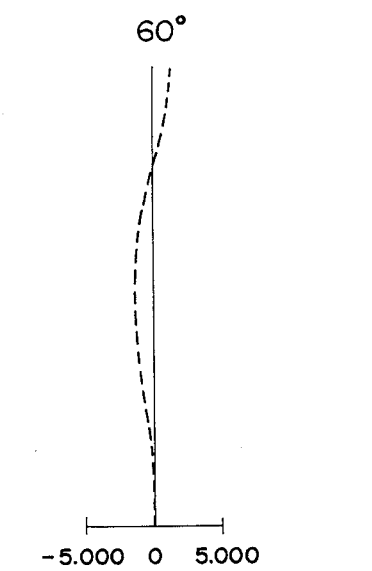

FIG. 23 shows the curvature of field of this embodiment in the main scanning direction.

Embodiment 22:

| $f = 200, s = 600, t = -61.657, X = -5.51, Y = -0.30829$ | | | | | |
|---|---|---|---|---|---|
| $R_1$ | $R_2$ | $d_0$ | $d_1$ | $D$ | $n$ |
| $-240$ | $-99.556$ | 43.8 | 20 | 157.408 | 1.8 |

The maximum deflection angle: 130°, the write width: 436.1, the linearity: 16.2% or less.

Figure 24:
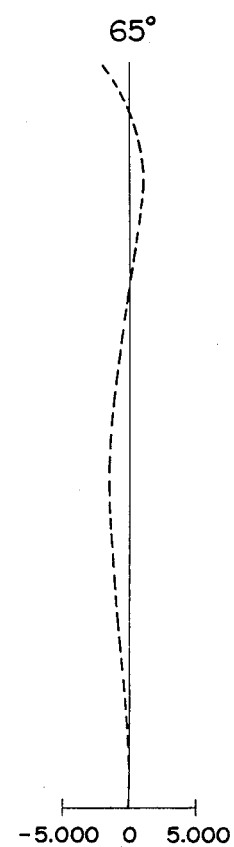

FIG. 24 shows the curvature of field of this embodiment in the main scanning direction.

As can be understood from the above embodiments, the linearity is up to about 20%, but can be corrected by electric signal processing.

In the above embodiments relating to the light beam scanning lens, only the curvature of field at the meridional image surface, i.e., the curvature of field in the main scanning direction is indicated for the reason that if the light beam scanning device is constructed as shown in FIG. 1, the curvature of field in the sagittal image surface, i.e., the curvature of field in the auxiliary scanning direction is slightly too large. The curvature of field in the auxiliary scanning direction can be corrected by various methods. Where a generally known reduced-size facet error correcting optical system is employed, the curvature of field in the auxiliary scanning direction which would be developed with no correcting optical system is of no substantial importance, and the curvature of field in the auxiliary scanning direction is determined by the deflection angle in the main scanning direction and the position of the correcting optical system.

Three embodiments of the light beam scanning device will be described below. The first embodiment has no means for correcting the curvature of field in the auxiliary scanning direction, and the other two embodiments have such correcting means. In these embodiments, the light beam scanning lens according to the embodiment 7 above is employed. The focus length thereof is 160 as the effective range scanned in the main scanning direction is set to about a letter size of 215.9 mm.

1st Device Embodiment:

The light beam scanning device is of an arrangement as shown in FIG. 1.

The light source Q is a semiconductor laser, and the light beam deflector is a polygon mirror.

| $f = 160, s = 240, t = -52.889, X = -4.78, Y = -0.33056$ | | | | | |
|---|---|---|---|---|---|
| $R_1$ | $R_2$ | $d_0$ | $d_1$ | $D$ | $n$ |
| $\infty$ | $-128$ | 44 | 16 | 96 | 1.8 |

Figure 26:
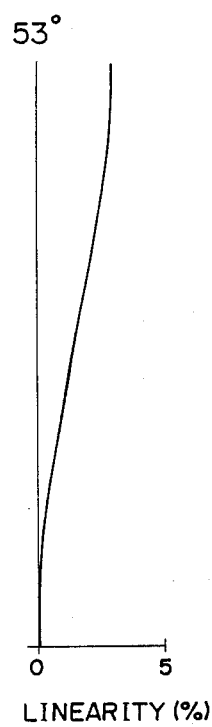
FIG. 26 is a diagram showing linearity exhibited by the light beam scanning device of the first embodiment.
Figure 25:
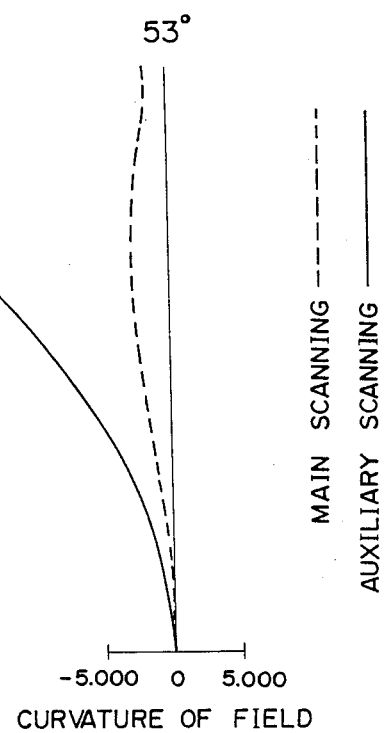
FIG. 25 is a diagram showing curvature of field produced by a light beam scanning device according to a first embodiment of the present invention.

The maximum deflection angle: 106°, the write width: 223.6, the linearity: 3.0% or less. The curvature of field developed by this embodiment is shown in FIG. 25. In the main scanning direction, the curvature of field is 2.7 mm under at the intermediate image height. In the auxiliary scanning direction, the curvature of field is under by about ten times the curvature of field in the main scanning direction. FIG. 26 shows linearity of the embodiment. Deviations from the constant scanning velocity can easily be corrected by electric signal processing.

2nd Device Embodiment:

FIG. 27 shows an embodiment in which an elongate cylindrical lens 8 is employed as a correcting optical system for correcting curvature of field in the auxiliary scanning direction. The light source Q, the condenser lens 2, and the light beam deflector are the same as those of the first device embodiment.

It is assumed that the distance between the surface of the light beam scanning lens 5 near the scanned surface and the surface of the elongate cylindrical lens 8 is indicated by $d_2$, the thickness of the lens 8 by $d_3$, the distance between the surface of the lens 8 near the scanned surface 6 and the scanned surface 6 by $d_4$, the radius of curvature of the surface of the elongate cylindrical lens 8 near the light beam scanning lens 5 by $R_{3Y}$ in the main scanning direction and by $R_{3Z}$ in the auxiliary scanning direction, the radius of curvature of the surface of the lens 8 near the scanned surface 6 by $R_{4Y}$ in the main scanning direction and by $R_{4Z}$ in the auxiliary scanning direction, the refractive index of the lens 8 by $n'$, and the focal lengths of the lens 8 in the main and auxiliary scanning directions by $f_Y$, $f_Z$, respectively.

| $f = 160, s = 240, t = -52.889, X = -4.78, Y = -0.33056$ | | | | | | | | | | | |
|---|---|---|---|---|---|---|---|---|---|---|---|
| $R_1$ | $R_2$ | $d_0$ | $d_1$ | $d_2$ | $d_3$ | $d_4$ | $n$ | $R_{3Y}$ | $R_{3Z}$ | $R_{4Y}$ | $R_{4Z}$ | $n'$ |
| $\infty$ | $-238$ | 44 | 16 | 68.08 | 3 | 25.9 | 1.8 | $\infty$ | 12.5 | $\infty$ | $\infty$ | 1.48519 |

$f_Y = \infty, f_Z = 25.763$

The maximum deflection angle: 106°, the write width: 223.1, the linearity: 3.0% or less. The curvature of field developed by this embodiment is shown in FIG. 28. FIG. 28 indicates that the curvature of field in the auxiliary scanning direction is greatly improved by the use of the elongate cylindrical lens 8. The linearity is the same as shown in FIG. 26. Deviations from the constant scanning velocity can easily be corrected by electric signal processing.

Figure 29:
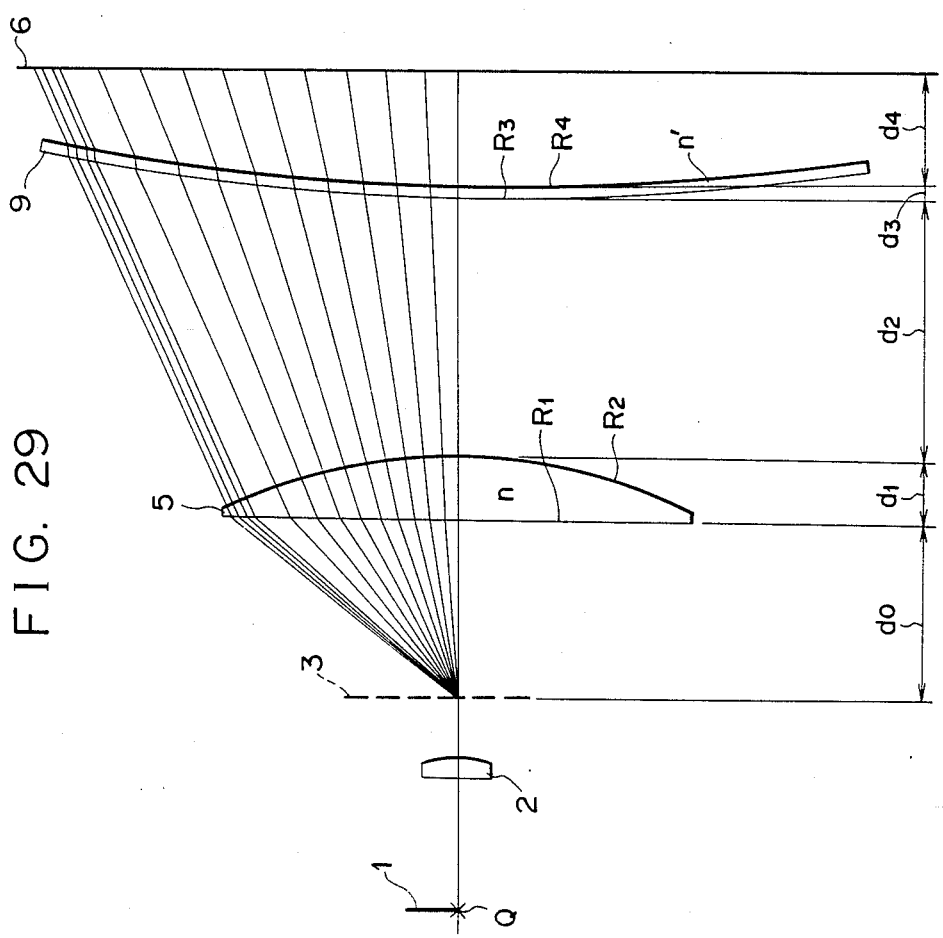
FIG. 29 is a schematic view illustrating a light beam scanning device according to a third embodiment of the present invention.

3rd Device Embodiment:

FIG. 29 shows an embodiment in which an elongate toroidal lens 9 is employed as a correcting optical system. The light source Q, the condenser lens 2, and the light beam deflector are the same as those of the first device embodiment.

As with the second device embodiment, it is assumed that the distance between the surface of the light beam scanning lens 5 near the scanned surface and the surface of the elongate toroidal lens 9 is indicated by $d_2$, the thickness of the lens 9 by $d_3$, the distance between the surface of the lens 9 near the scanned surface 6 and the scanned surface 6 by $d_4$, the radius of curvature of the surface of the elongate toroidal lens 9 near the light beam scanning lens 5 by $R_{3Y}$ in the main scanning direction and by $R_{3Z}$ in the auxiliary scanning direction, the radius of curvature of the surface of the lens 9 near the scanned surface 6 by $R_{4Y}$ in the main scanning direction and by $R_{4Z}$ in the auxiliary scanning direction, the refractive index of the lens 9 by n', and the focal lengths of the lens 9 in the main and auxiliary scanning directions by $f_Y$, $f_Z$, respectively.

$R = \infty$, the radius of curvature of the second surface is $R' = -102.236$, the refractive index is $n = 1.51118$, the surface-to-surface distance on the optical axis is $d_1 = 22$, and the focal length is $f = 200$. The distance from the point where the light beam is deflected to the naturally focused point Q' is $D = 181.926$, and the distance from the point where the light beam is deflected to the first surface of the light beam scanning surface is $d_0 = 36$.

Figures 32, 33:
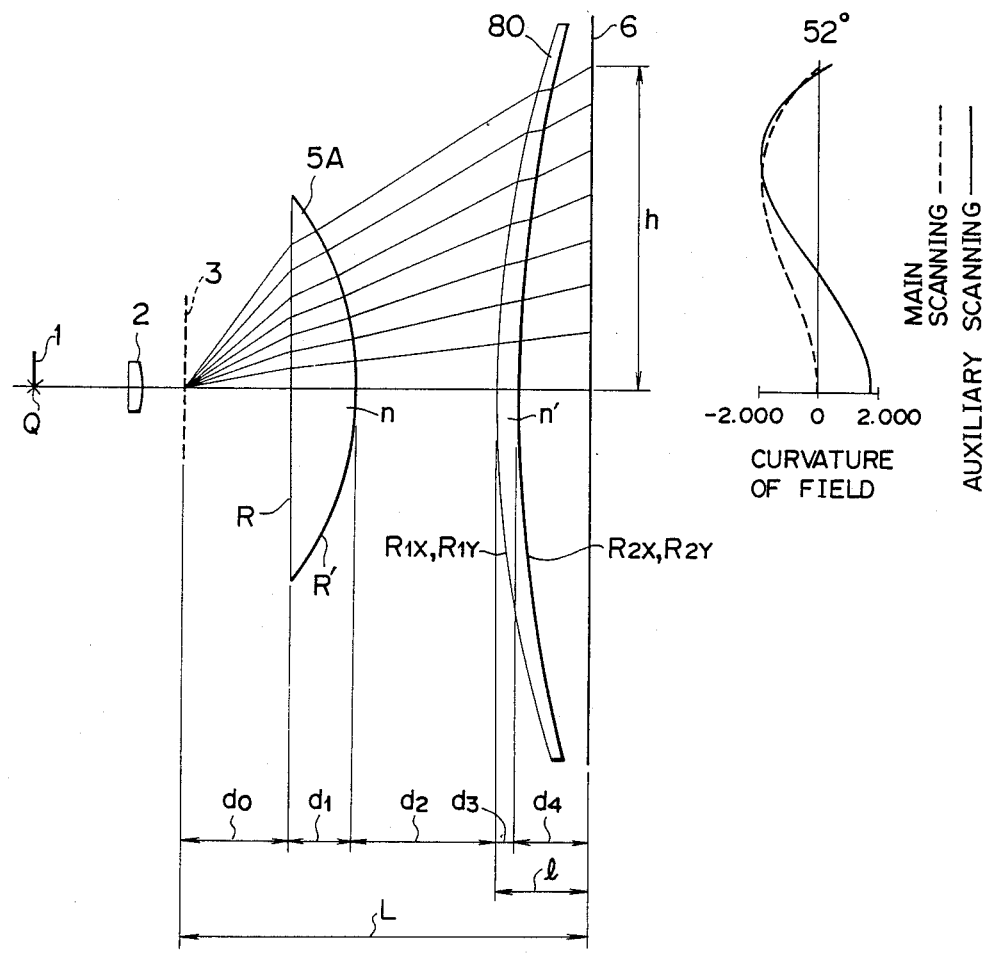
FIG. 32 is a schematic view illustrating an embodiment of the light beam scanning device of FIG. 31.
FIG. 33 is a diagram showing curvature of field developed by the light beam scanning device shown in FIG. 32.

As shown in FIG. 32, it is assumed that the distance between the second surface of the light beam scanning lens 5A and the first surface of the elongate toroidal lens 80 is represented by $d_2$, the thickness of the lens 80 by $d_3$, the distance between the second surface of the lens 80 and the scanned surface 6 by $d_4$, the radius of curvature of the first surface of the elongate toroidal lens 80 by $R_{1X}$ in the main scanning direction and by $R_{1Y}$ in the auxiliary scanning direction, the radius of curvature of the second surface of the lens 80 by $R_{2X}$ in the main scanning direction and by $R_{2Y}$ in the auxiliary scanning direction, the refractive index of the lens 80 by n', and the focal lengths of the lens 80 in the main and auxiliary scanning directions by $f'_X$, $f'_Y$, respectively.

These parameters in FIG. 32 have the following numerical values: $d_2 = 47.5$, $d_3 = 6$, $d_4 = 27.334$, $R_{1X} = 400$, $R_{1Y} = 12.5$, $R_{2X} = 460$, $R_{2Y} = \infty$, $n' = 1.48519$, $f'_X = 6120.597$, and $f'_Y = 25.763$. In the following description, X indicates $(l^2 + h^2)/(2l \cdot R_{1X})$ in the condition (I), and Y represents $(n' - 1)\{(1/R_{1X}) - (1/R_{2X})\}L$ in the condition (II).

| | | $f = 160$, $s = 240$, $t = -52.889$, $X = -4.78$, $Y = -0.33056$ | | | | | | | | | |
|---|---|---|---|---|---|---|---|---|---|---|---|
| $R_1$ | $R_2$ | $d_0$ | $d_1$ | $d_2$ | $d_3$ | $d_4$ | n | $R_{3Y}$ | $R_{3Z}$ | $R_{4Y}$ | $R_{4Z}$ | n' |
| $\infty$ | $-128$ | 44 | 16 | 68.81 | 3 | 28.17 | 1.8 | 633 | 12.5 | 630 | $\infty$ | 1.48519 |

$f_Y = -406905$, $f_Z = 25.763$

Figure 30:
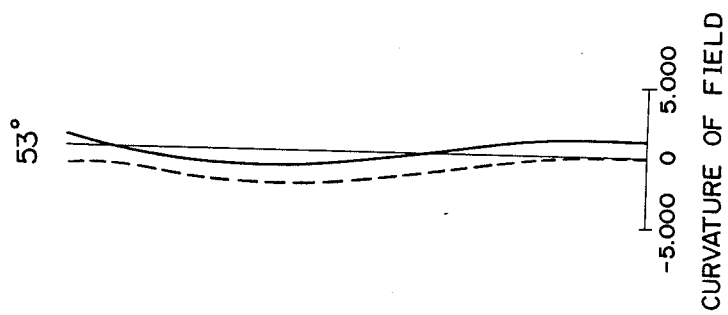
FIG. 30 is a diagram showing curvature of field produced by the light beam scanning device of the third embodiment.

The maximum deflection angle: 106°, the write width: 222.7, the linearity: 3.0% or less. The curvature of field developed by this embodiment is shown in FIG. 30. FIG. 30 indicates that the curvatures of field in the main and auxiliary scanning directions are substantially the same as each other. The linearity is the same as shown in FIG. 26. Deviations from the constant scanning velocity can easily be corrected by electric signal processing.

By employing the other lens embodiments, good light beam scanning devices can also be constructed and the curvature of field in the auxiliary scanning direction can also be well corrected by the correcting optical system.

Another embodiment of the light beam scanning device in which curvatures of field in the main and auxiliary scanning directions are well corrected will be described below.

4th Device Embodiment:

Denoted at 1, 2, 3, 6 in FIG. 32 are the light source, the cylindrical lens, the deflection surface of the light beam deflector, and the scanned surface. The reference numeral 80 represents an elongate toroidal lens which also has refracting power in the main scanning direction.

A light beam scanning lens denoted at 5A has characteristics described with reference to FIG. 31. More specifically, the radius of curvature of the first surface is In FIG. 32, $L = 138.834$, $h = 108.1$, and $l = 33.334$. Hence, $X = 0.480$ and $Y = 0.022$.

The curvature of field in the light beam scanning device of FIG. 32 is illustrated in FIG. 33. As can be understood from FIG. 33, the maximum deflection angle: 104°, the write width: 216.2, and the linearity, though not shown, is 9.9% or less which is the same as that in FIG. 49 which will be described later on.

13 embodiments which are similar to the above embodiment will hereinafter be described.

In these embodiments, the light beam scanning lens 5A shown in FIG. 32 is employed. That is, the radius of curvature of the first surface is $R = \infty$, the radius of curvature of the second surface is $R' = -102.236$, the refractive index is $n = 1.51118$, the surface-to-surface distance on the optical axis is $d_1 = 22$, and the focal length is $f = 200$. Moreover, $D = 181.926$, and the distance from the point where the light beam is deflected to the first surface of the light beam scanning surface is $d_0 = 36$. The parameters $d_2$, $d_3$, $d_4$ are the same as shown in FIG. 32.

5th Device Embodiment:

| $d_2$ | $d_3$ | $d_4$ | $R_{1X}$ | $R_{1Y}$ | $R_{2X}$ | $R_{2Y}$ | n' | $f'_X$ | $f'_Y$ | L | h | l | X | Y |
|---|---|---|---|---|---|---|---|---|---|---|---|---|---|---|
| 47.4 | 6 | 27.472 | 800 | 12.5 | 1800 | $\infty$ | 1.48519 | 2962.103 | 25.763 | 138.872 | 108.1 | 33.472 | 0.239 | 0.047 |

Figure 34:
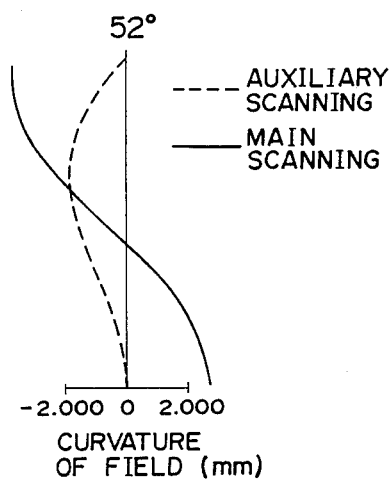
FIGS. 34 through 46 are diagrams showing curvature of field produced by light beam scanning devices according to fifth through seventeenth embodiments of the present invention.

The write width: 216.2 FIG. 34 shows curvatures of field of this embodiment in the main and auxiliary scanning directions.

6th Device Embodiment:

| $d_2$ | $d_3$ | $d_4$ | $R_{1X}$ | $R_{1Y}$ | $R_{2X}$ | $R_{2Y}$ | n' | $f_X$ | $f_Y$ | L | h | l | X | Y |
|---|---|---|---|---|---|---|---|---|---|---|---|---|---|---|
| 55.3 | 6 | 19.694 | 600 | 10 | 920 | ∞ | 1.48519 | 3533.663 | 20.61 | 138.994 | 108.6 | 25.694 | 0.404 | 0.039 |

Figure 35:
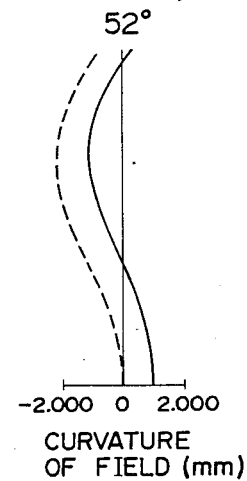

The write width: 217.2 FIG. 35 shows curvatures of field of this embodiment in the main and auxiliary scanning directions.

Figure 39:
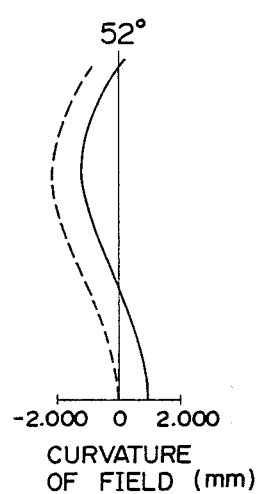

FIG. 39 shows curvatures of field of this embodiment in the main and auxiliary scanning directions.

11th Device Embodiment:

| $d_2$ | $d_3$ | $d_4$ | $R_{1X}$ | $R_{1Y}$ | $R_{2X}$ | $R_{2Y}$ | n' | $f_X$ | $f_Y$ | L | h | l | X | Y |
|---|---|---|---|---|---|---|---|---|---|---|---|---|---|---|
| 54.9 | 6 | 20.329 | 600 | 12.5 | 900 | ∞ | 1.6 | 2977.667 | 20.833 | 139.229 | 108.4 | 26.329 | 0.394 | 0.046 |

Figure 40:
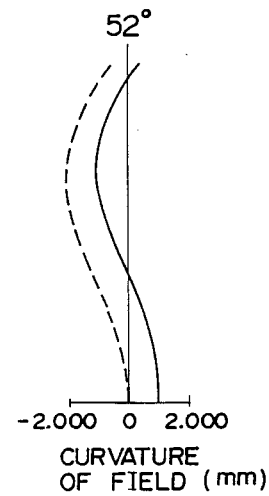

7th Device Embodiment:

The write width: 216.8 FIG. 40 shows curvatures of field

| $d_2$ | $d_3$ | $d_4$ | $R_{1X}$ | $R_{1Y}$ | $R_{2X}$ | $R_{2Y}$ | n' | $f_X$ | $f_Y$ | L | h | l | X | Y |
|---|---|---|---|---|---|---|---|---|---|---|---|---|---|---|
| 42.3 | 3 | 34.517 | 270 | 14 | 295 | ∞ | 1.48519 | 6318.789 | 28.855 | 137.817 | 108.3 | 35.517 | 0.648 | 0.021 |

Figure 36:
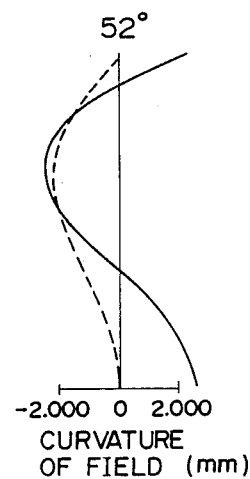

The write width: 216.6
FIG. 36 shows curvatures of field of this embodiment in the main and auxiliary scanning directions.

of this embodiment in the main and auxiliary scanning directions.

12th Device Embodiment:

| $d_2$ | $d_3$ | $d_4$ | $R_{1X}$ | $R_{1Y}$ | $R_{2X}$ | $R_{2Y}$ | n' | $f_X$ | $f_Y$ | L | h | l | X | Y |
|---|---|---|---|---|---|---|---|---|---|---|---|---|---|---|
| 56.1 | 6 | 19.234 | 1200 | 12.5 | 3600 | ∞ | 1.6 | 2997.19 | 20.833 | 139.334 | 108.5 | 25.234 | 0.205 | 0.046 |

Figure 41:
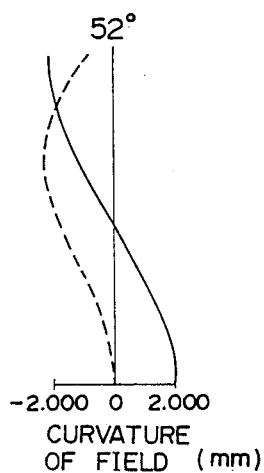

8th Device Embodiment:

The write width: 217.2 FIG. 41 shows curvatures of field

| $d_2$ | $d_3$ | $d_4$ | $R_{1X}$ | $R_{1Y}$ | $R_{2X}$ | $R_{2Y}$ | n' | $f_X$ | $f_Y$ | L | h | l | X | Y |
|---|---|---|---|---|---|---|---|---|---|---|---|---|---|---|
| 43.5 | 6 | 31.334 | 500 | 14 | 590 | ∞ | 1.48519 | 6611.663 | 28.855 | 138.834 | 108.1 | 37.334 | 0.35 | 0.021 |

Figure 37:
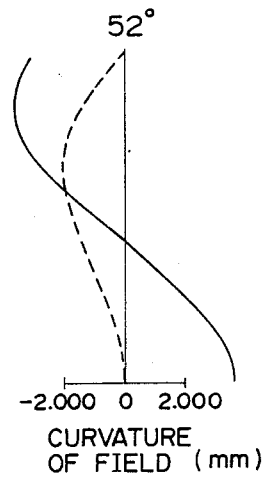

The write width: 216.2 FIG. 37 shows curvatures of field of this embodiment in the main and auxiliary scanning directions.

of this embodiment in the main and auxiliary scanning directions.

13th Device Embodiment:

| $d_2$ | $d_3$ | $d_4$ | $R_{1X}$ | $R_{1Y}$ | $R_{2X}$ | $R_{2Y}$ | n' | $f_X$ | $f_Y$ | L | h | l | X | Y |
|---|---|---|---|---|---|---|---|---|---|---|---|---|---|---|
| 51 | 6 | 24.12 | 470 | 14 | 600 | ∞ | 1.6 | 3553.875 | 23.333 | 139.12 | 108.1 | 30.12 | 0.445 | 0.038 |

Figure 42:
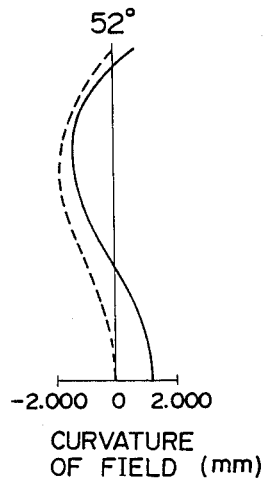

9th Device Embodiment:

The write width: 216.2 FIG. 42 shows curvatures of field

| $d_2$ | $d_3$ | $d_4$ | $R_{1X}$ | $R_{1Y}$ | $R_{2X}$ | $R_{2Y}$ | n' | $f_X$ | $f_Y$ | L | h | l | X | Y |
|---|---|---|---|---|---|---|---|---|---|---|---|---|---|---|
| 38 | 3 | 38.737 | 220 | 12.5 | 227 | ∞ | 1.4 | 15980 | 31.25 | 137.737 | 108.3 | 41.737 | 0.734 | 0.008 |

Figure 38:
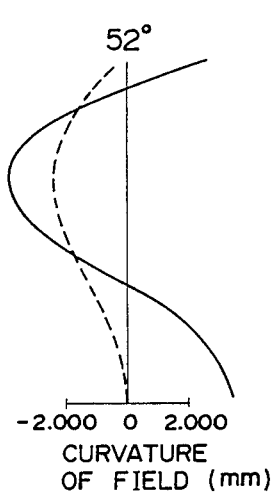

The write width: 216.6 FIG. 38 shows curvatures of field of this embodiment in the main and auxiliary scanning directions.

of this embodiment in the main and auxiliary scanning directions.

14th Device Embodiment:

| $d_2$ | $d_3$ | $d_4$ | $R_{1X}$ | $R_{1Y}$ | $R_{2X}$ | $R_{2Y}$ | n' | $f_X$ | $f_Y$ | L | h | l | X | Y |
|---|---|---|---|---|---|---|---|---|---|---|---|---|---|---|
| 52.2 | 6 | 22.973 | 800 | 14 | 1800 | ∞ | 1.6 | 2394.612 | 23.333 | 139.17 | 108.1 | 28.973 | 0.27 | 0.058 |

Figure 43:
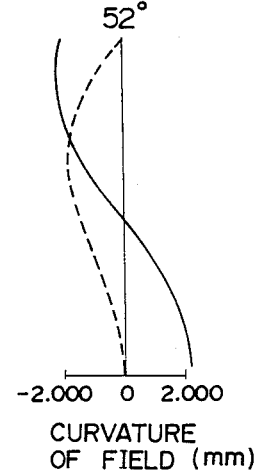

10th Device Embodiment:

The write width: 216.2 FIG. 43 shows curvatures of field

| $d_2$ | $d_3$ | $d_4$ | $R_{1X}$ | $R_{1Y}$ | $R_{2X}$ | $R_{2Y}$ | n' | $f_X$ | $f_Y$ | L | h | l | X | Y |
|---|---|---|---|---|---|---|---|---|---|---|---|---|---|---|
| 55.2 | 6 | 19.792 | 600 | 10 | 920 | ∞ | 1.4 | 4289.520 | 25 | 138.992 | 108.6 | 25.792 | 0.403 | 0.032 | of this embodiment in the main and auxiliary scanning directions.

The write width: 217.2

15th Device Embodiment:

| $d_2$ | $d_3$ | $d_4$ | $R_{1X}$ | $R_{1Y}$ | $R_{2X}$ | $R_{2Y}$ | $n'$ | $f'_X$ | $f'_Y$ | L | h | l | X | Y |
|---|---|---|---|---|---|---|---|---|---|---|---|---|---|---|
| 47.9 | 6 | 27.488 | 420 | 20 | 480 | ∞ | 1.8 | 4021.277 | 25 | 139.388 | 107.7 | 33.488 | 0.452 | 0.033 |

The write width: 215.4

Figure 44:
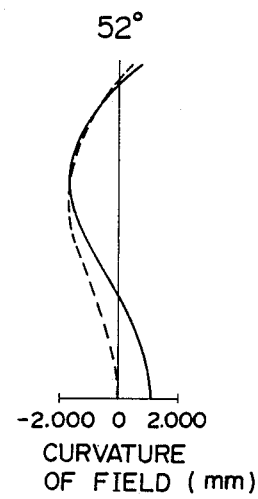

FIG. 44 shows curvatures of field of this embodiment in the main and auxiliary scanning directions.

16th Device Embodiment:

| $d_2$ | $d_3$ | $d_4$ | $R_{1X}$ | $R_{1Y}$ | $R_{2X}$ | $R_{2Y}$ | $n'$ | $f'_X$ | $f'_Y$ | L | h | l | X | Y |
|---|---|---|---|---|---|---|---|---|---|---|---|---|---|---|
| 49.5 | 6 | 26.037 | 800 | 20 | 1200 | ∞ | 1.8 | 2980.132 | 25 | 139.537 | 107.9 | 32.037 | 0.247 | 0.047 |

Figure 45:
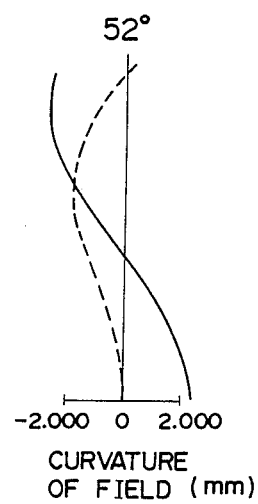

The write width: 215.8 FIG. 45 shows curvatures of field of this embodiment in the main and auxiliary scanning directions.

17th Device Embodiment:

| $d_2$ | $d_3$ | $d_4$ | $R_{1X}$ | $R_{1Y}$ | $R_{2X}$ | $R_{2Y}$ | $n'$ | $f'_X$ | $f'_Y$ | L | h | l | X | Y |
|---|---|---|---|---|---|---|---|---|---|---|---|---|---|---|
| 43.8 | 6 | 30.963 | 400 | ∞ | 460 | −12.5 | 1.48519 | 6120.597 | 25.763 | 138.763 | 107.9 | 36.963 | 0.44 | 0.022 |

Figure 46:
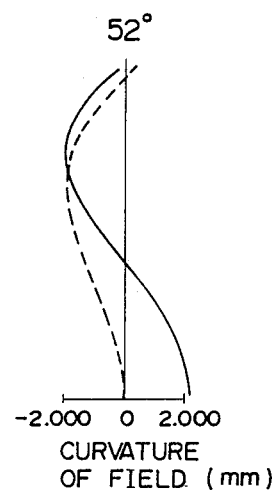

The write width: 215.8 FIG. 46 shows curvatures of field of this embodiment in the main and auxiliary scanning directions.

Figure 49:
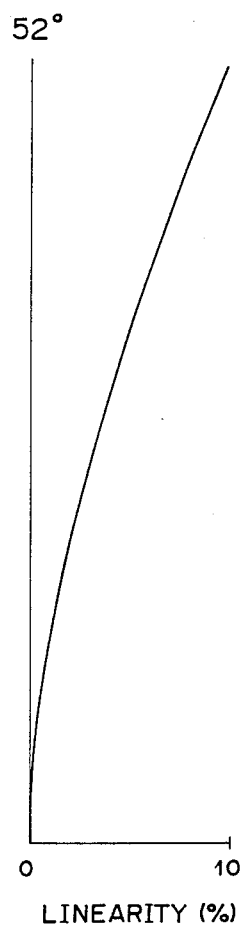

The linearity in each embodiment is substantially the same as that shown in FIG. 49, i.e., about 10% or less, and can electrically be corrected. The maximum deflection angle in each embodiment is 104°, and the write width is set to a letter size, i.e., 215.9 mm. The first surface of the elongate toroidal lens in each of the device embodiments 4 through 16 is a toroidal surface. The refractive index of the elongate toroidal lens is 1.48519 in each of the fifth through eighth embodiments, 1.4 in each of the ninth and tenth embodiments, 1.6 in each of the eleventh through fourteenth embodiments, and 1.8 in each of the fifteenth and sixteenth embodiments.

In the seventeenth device embodiment, the second surface of the elongate toroidal lens is a toroidal surface.

Advantages accruing from the use of the elongate toroidal lens having power in both the main and auxiliary scanning directions will be described below in comparison with comparative examples.

Figures 47, 48:
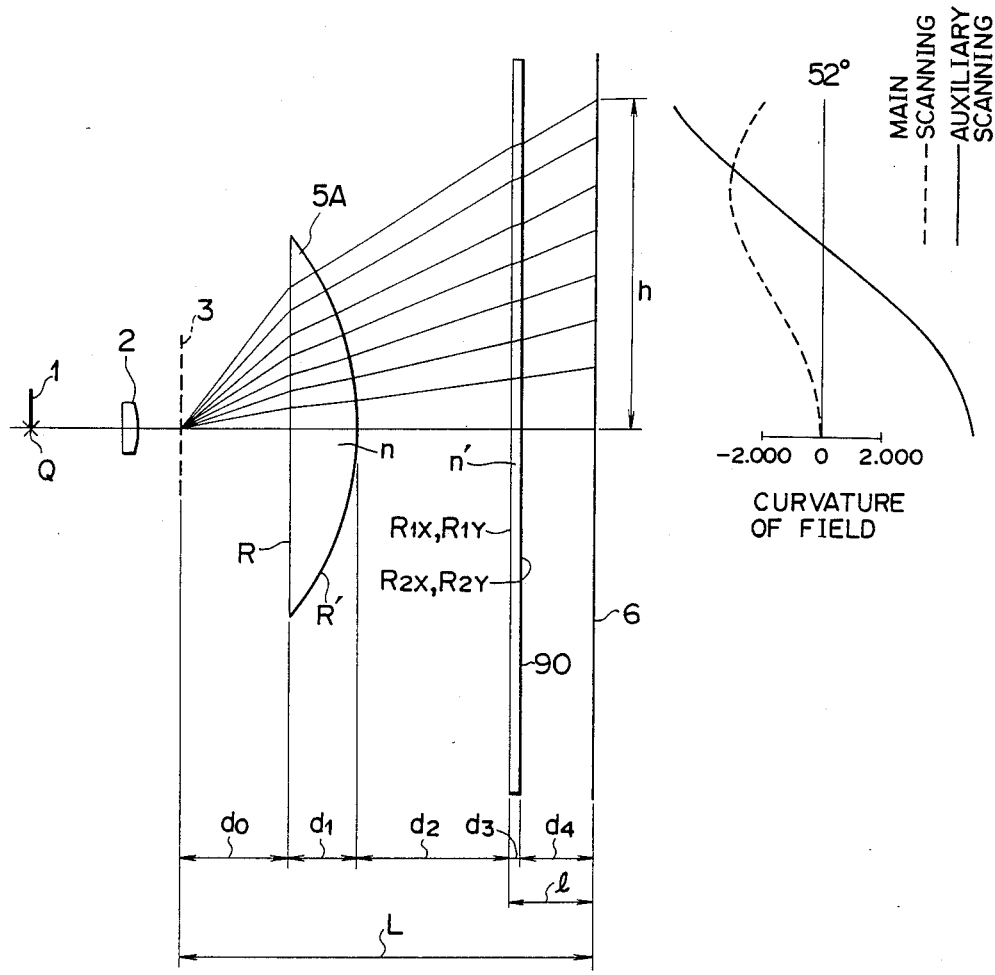
FIGS. 47 through 51 are schematic views illustrating comparative examples with respect to the light beam scanning device shown in FIG. 31.

Comparative Example:

FIG. 47 shows a light beam scanning device having a combination of the light beam scanning lens 5A and an elongate cylindrical lens 90 as a correcting optical system. The distance between the second surface of the light beam scanning lens 5A and the first surface of the elongate cylindrical lens 90 is indicated by $d_2$, the thickness of the lens 90 by $d_3$, and the distance between the second surface of the lens 90 and the scanned surface 6 by $d_4$.

The elongate cylindrical lens 90 is regarded as a special elongate toroidal lens, and the radius of curvature L of the first surface of the lens 90 is represented by $R_{1X}$ in the main scanning direction and by $R_{1Y}$ in the auxiliary scanning direction, the radius of curvature of the second surface of the lens 90 by $R_{2X}$ in the main scanning direction and by $R_{2Y}$ in the auxiliary scanning direction, the refractive index of the lens 90 by $n'$, and the focal lengths of the lens 90 in the main and auxiliary scanning directions by $f'_X$, $f'_Y$, respectively.

These parameters in FIG. 47 have the following numerical values: $d_2=51.4$, $d_3=3$, $d_4=25.868$, $R_{1X}=\infty$, $R_{1Y}=12.5$, $R_{2X}=\infty$, $R_{2Y}=\infty$, $n'=1.48519$, $f'_X=\infty$, and $f'_Y=25.763$ In FIG. 47, L=138.268, h=109.3, and l=28.868.

The curvature of field in the light beam scanning device of FIG. 47 is illustrated in FIG. 48, and the linearity thereof in FIG. 49. As can be understood from FIGS. 48 and 49, the maximum deflection angle: 104°, the write width: 218.6, and the linearity is 9.9% or less. The curvature of field in the main scanning direction is practical but slightly under, and the curvature of field in the auxiliary scanning direction is slightly too large to be practical. The linearity can sufficiently be corrected by electric signal processing.

Figures 50, 51:
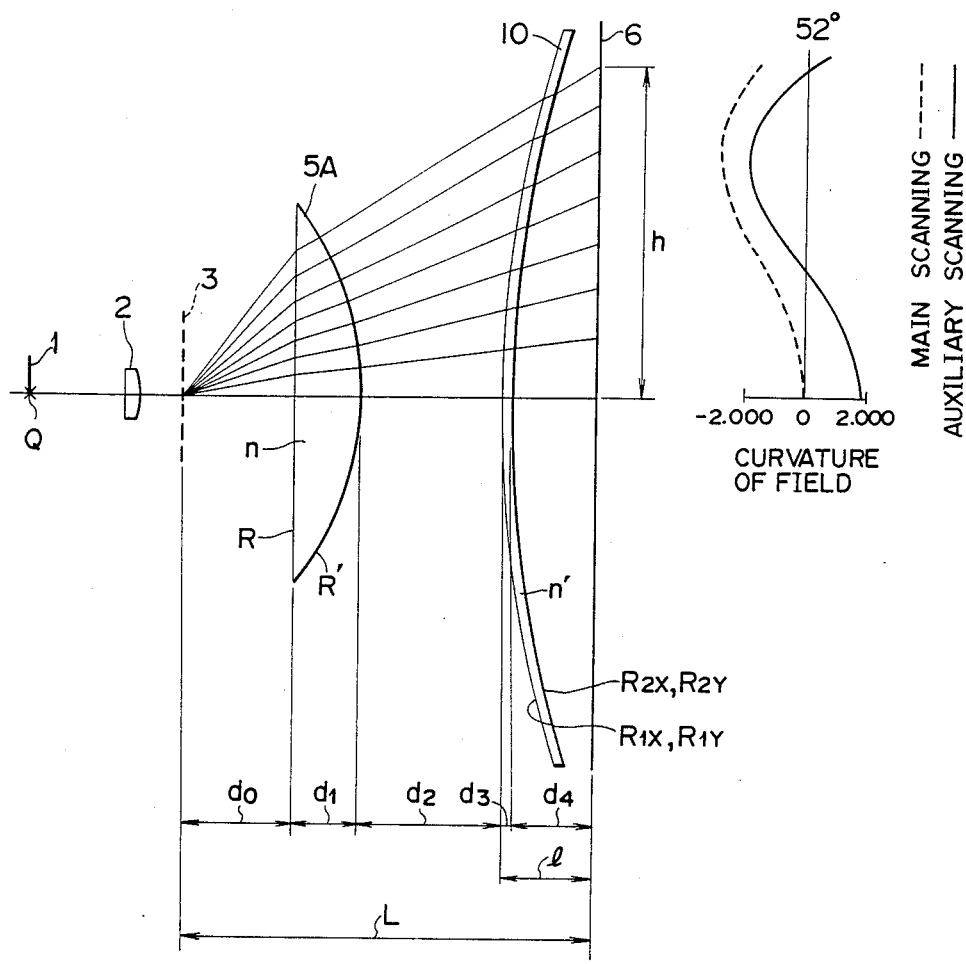

FIG. 50 shows a light beam scanning device having a combination of the light beam scanning lens 5A and an elongate toroidal lens 10 as a correcting optical system which has almost no refracting power in the main scanning direction.

The distance between the second surface of the light beam scanning lens 5A and the first surface of the elongate toroidal lens 10 is indicated by $d_2$, the thickness of the lens 10 by $d_3$, and the distance between the second surface of the lens 10 and the scanned surface 6 by $d_4$. The radius of curvature of the first surface of the lens 10 is represented by $R_{1X}$ in the main scanning direction and by $R_{1Y}$ in the auxiliary scanning direction, the radius of curvature of the second surface of the lens 10 by $R_{2X}$ in the main scanning direction and by $R_{2Y}$ in the auxiliary scanning direction, the refractive index of the lens 10 by $n'$, and the focal lengths of the lens 10 in the main and auxiliary scanning directions by $f'_X$, $f'_Y$, respectively.

These parameters in FIG. 50 have the following numerical values: $d_2=47.8$, $d_3=3$, $d_4=29.316$, $R_{1X}=400$, $R_{1Y}=12.5$, $R_{2X}=400$, $R_{2Y}=\infty$, $n'=1.48519$, $f'_X=336478.3$, and $f'_Y=25.763$.

In FIG. 50, L=138.116, h=108.8, and l=32.316. Hence, X=0.488 and Y=0.

The curvature of field in the light beam scanning device of FIG. 50 is illustrated in FIG. 51. As can be understood from FIG. 51, the maximum deflection angle: 104°, the write width: 217.6, and the linearity, though not shown, is 9.9% or less which is substantially the same as that in FIG. 49.

The curvature of field in the main scanning direction is almost the same as that in FIG. 47, but the curvature of field in the auxiliary scanning direction is greatly improved. The linearity can sufficiently be corrected by electric signal processing.

Comparison between the curvatures of field of the comparative examples shown in FIGS. 47 and 50 and those of the fourth through seventeenth device embodiments indicate that the curvature of field of the device embodiments in the auxiliary scanning direction remains substantially the same as that in FIGS. 47 and 50, but the curvature of field in the main scanning direction is greatly improved over that in FIGS. 47 and 50. The linearity of the device embodiments can sufficiently be corrected electric signal processing.

Although certain preferred embodiments have been shown and described, it should be understood that many changes and modifications may be made therein without departing from the scope of the appended claims.

What is claimed is:

1. A light beam scanning lens for focusing a convergent light beam deflected at a constant angular velocity into a beam spot on a scanned surface and scanning the focused light beam at a substantially constant velocity, said light beam scanning lens comprising:

a single lens having a refractive index n and a focal length f, and meeting the following condition:

$$R_2 < 0 \text{ and } |R_1| > |R_2|$$

where $R_1$ is the radius of curvature of a surface of the lens near a point where the incident light beam is deflected, and $R_2$ is the radius of curvature of a surface of the lens near the scanned surface; and also the following conditions:

$$-7 < (nf/t) + (f/s) < -0.6 \quad \text{(i)}$$

$$-0.41 < (t/f) < -0.13 \quad \text{(ii)}$$

where t is the distance as measured from a front principal point of the lens up to an entrance pupil, and s is the distance as measured from the front principal point up to a naturally focused point.

2. A light beam scanning device comprising:
a light source for radiating a light beam;
a condenser optical system for converging the light beam from the light source;
a light beam deflector for deflecting the convergent light beam from the condenser optical system at a constant angular velocity; and
a light beam scanning lens for focusing the convergent light beam deflected by said light beam deflector into a beam spot on a scanned surface and scanning the focused light beam at a substantially constant velocity, said light beam scanning lens comprising a single lens having a refractive index n and a focal length f, and meeting the following condition:

$$R_2 < 0 \text{ and } |R_1| > |R_2|$$

where $R_1$ is the radius of curvature of a surface of the lens near a point where the incident light beam is deflected, and $R_2$ is the radius of curvature of a surface of the lens near the scanned surface; and also the following conditions:

$$-7 < (nf/t) + (f/s) < -0.6 \quad \text{(i)}$$

$$-0.41 < (t/f) < -0.13 \quad \text{(ii)}$$

where t is the distance as measured from a front principal point of the lens up to an entrance pupil, and s is the distance as measured from the front principal point up to a naturally focused point.

3. A light beam scanning device comprising:
a light source for radiating a light beam;
a condenser optical system for converging the light beam from the light source;
a light beam deflector for deflecting the convergent light beam from the condenser optical system at a constant angular velocity;
a light beam scanning lens for focusing the convergent light beam deflected by said light beam deflector into a beam spot on a scanned surface and scanning the focused light beam at a substantially constant velocity in a main scanning direction, said light beam scanning lens comprising a single lens having a refractive index n and a focal length f, and meeting the following condition:

$$R_2 < 0 \text{ and } |R_1| > |R_2|$$

where $R_1$ is the radius of curvature of a surface of the lens near a point where the incident light beam is deflected, and $R_2$ is the radius of curvature of a surface of the lens near the scanned surface; and also the following conditions:

$$-7 < (nf/t) + (f/s) < -0.6 \quad \text{(i)}$$

$$-0.41 < (t/f) < -0.13 \quad \text{(ii)}$$

where t is the distance as measured from a front principal point of the lens up to an entrance pupil, and s is the distance as measured from the front principal point up to a naturally focused point; and
correcting means for correcting curvature of field in an auxiliary scanning direction.

4. A light beam scanning device according to claim 3, wherein said correcting means comprises an elongate cylindrical lens disposed between the light beam scanning lens and the scanned surface.

5. A light beam scanning device according to claim 3, wherein said correcting means comprises an elongate toroidal lens disposed between the light beam scanning lens and the scanned surface and having substantially no power in the main scanning direction.

6. A light beam scanning device comprising:
a light source for radiating a light beam;
a condenser optical system for converging the light beam from the light source;
a light beam deflector for deflecting the convergent light beam from the condenser optical system at a constant angular velocity;
a light beam scanning lens for focusing the convergent light beam deflected by said light beam deflector into a beam spot on a scanned surface and scanning the focused light beam at a substantially constant velocity, said light beam scanning lens comprising a single lens having a refractive index n and a focal length f, and meeting the following condition:

$$R_2 < 0 \text{ and } |R_1| > |R_2|$$

where $R_1$ is the radius of curvature of a surface of the lens near a point where the incident light beam is deflected, and $R_2$ is the radius of curvature of a surface of the lens near the scanned surface; and also meeting the following conditions:

$$-7 < (nf/t) + (f/s) < -0.6 \quad \text{(i)}$$

$$-0.41 < (t/f) < -0.13 \quad \text{(ii)}$$

where t is the distance as measured from a front principal point of the lens up to an entrance pupil, and s is the distance as measured from the front principal point up to a naturally focused point; and a correcting optical system coacting with said light beam scanning lens for focusing the convergent light beam into a spot substantially on the scanned surface, said correcting optical system comprising an elongate toroidal lens disposed between the light beam scanning lens and the scanned surface and having a first convex surface facing said light beam deflector in a main scanning direction, said toroidal lens meeting the following conditions:

$$0.2 < (l^2 + h^2)/(2l \cdot R_{1X}) < 0.74 \qquad (I)$$

$$0.007 < (n' - 1)\{(1/R_{1X}) - (1/R_{2X})\}L < 0.059 \qquad (II)$$

where n' is the refractive index, $R_{1X}$ is the radius of curvature of said first surface in the main scanning direction, $R_{2X}$ is the radius of curvature of a second surface in the main scanning direction, l is the distance from said first surface to the scanned surface, h is ½ of the effective scanning range, and L is the distance from a deflector to the scanned surface.

* * * * *